Oct. 28, 1958

C. L. GRAYBILL 2,857,997

POWER DRIVEN TOOL CHUCK

Filed June 15, 1956

CLINTON L. GRAYBILL
INVENTOR.

BY *James L. Givnan*
ATT'Y

United States Patent Office 2,857,997
Patented Oct. 28, 1958

2,857,997
POWER DRIVEN TOOL CHUCK
Clinton L. Graybill, Superior, Mont.
Application June 15, 1956, Serial No. 591,754
1 Claim. (Cl. 192—34)

This invention relates to improvements in power tools and more especially to a screw driving attachment for power drills and the like.

It is the prinicpal object of the invention to provide an attachment of this character which is of simple, efficient, durable construction embodying a minimum number of parts and wherein adjustment of the torque control of the driving element and the clutch releasing mechanism associated therewith can be quickly and conveniently accomplished by one hand of an operator without interrupting or stopping the driving operation and without the use of wrenches, screw drivers or other tools.

The foregoing and other objects will appear as my invention is more fully hereinafter described in the following specification, illustrated in the accompanying drawing and finally pointed out in the appended claim.

Figure 2:
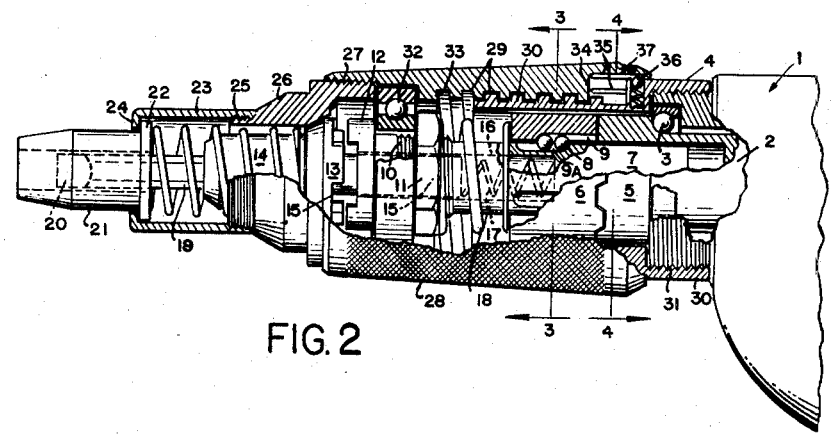
Figure 2 is a longitudinal sectional side view of Figure 1 with fragments broken away and parts in section for clearness of illustration.
Figure 3:
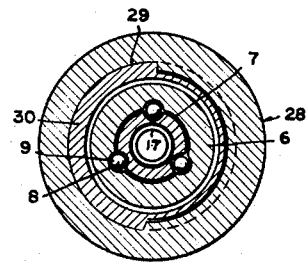
Figure 4:
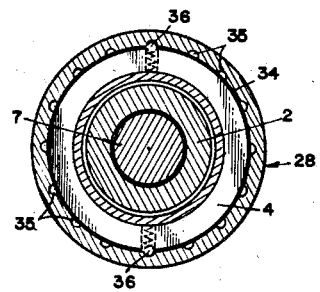

Figures 3 and 4 are sectional end views taken respectively along the lines 3—3 and 4—4 of Figure 2.

Figure 1:
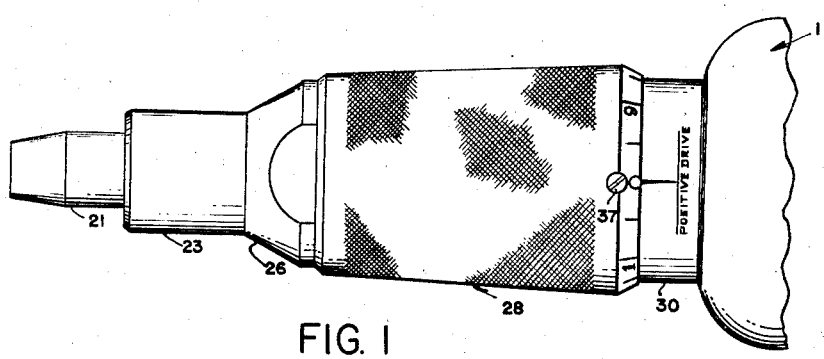
Figure 1 is a top plan view of a power driver attachment made in accordance with my invention and shown applied to a fragment of an electric motor or driver.

Referring now more particularly to the drawing:

In Figures 1 and 2 reference numeral 1 indicates the main body of a power drill or housing for an electric motor having a hollow shaft 2 connected to, or made a part of, the motor shaft and journaled in a radial thrust bearing 3 disposed within the open end of an externally threaded tubular extension 4 of the motor housing. The outer end of the hollow shaft 2 terminates in a clutch element 5 cooperating with a companion clutch element 6 slidable along and rotatable with a shaft 7, to which it is attached by ball elements 8 operating in grooves or splines 9 formed on inner periphery of the clutch element 6 and in matching grooves 9A formed on the periphery of the shaft 7. One end of the shaft 7 is journaled within the hollow shaft 2 and its opposite end is externally threaded as at 10 to accommodate a nut 11, and its outermost end terminates in a clutch element 12 for cooperation with a companion clutch element 13 formed integral with a forwardly extending tool chuck 14 and a rearwardly extending shaft 15 rotatably mounted in a bore 16 extending inwardly from the forward end of the shaft 7 and the clutch element 12.

Within the bore 16 is a compression spring 17 whose one end bears against the inner end of the bore 16 and whose opposite end bears against the inner end of the shaft 15 of the clutch element 13 for normally maintaining both of said clutch elements disengaged as shown. An adjustable compression spring 18 surrounds the shaft 7 and bears against the forward end of the clutch element 6 and against the nut 11 for normally maintaining the clutch elements 6 and 5 engaged, as shown.

The interior of the chuck 14 of the clutch element 13 is provided with a snap ring, or any other suitable conventional means, for removably attaching one end of a driver bit 19 within the chuck. The bit end 20 of the driver is housed within a finder 21 provided with a flange 22 at its inner end. The finder is slidable within a cylindrical housing 23 flanged inwardly as at 24 and its forward end and internally threaded as at 25 at its opposite end for attachment to a collar 26 whose opposite end is externally threaded for attachment as at 27 to the internal threads at the forward end of a manually rotatable adjusting sleeve 28 provided on its interior with Acme threads 29, by means of which the sleeve is threadedly and adjustably attached to the externally correspondingly threaded exterior of a housing 30 threadedly secured as at 31 to the externally threaded tubular extension 4 of the motor housing 1. The forward end of the shaft 7 is provided with a radial bearing 32 whose inner race is secured to the rear surface of the clutch element 12 by the nut 11 and whose outer race is positioned between the inner end of the collar 26 and an internal annular shoulder 33 near the forward end of the sleeve 28. The opposite end of the sleeve 28 is bored inwardly as at 34 and the peripheral wall of the bore is provided with a plurality of circumferentially spaced apart parallel grooves 35 adapted to be engaged by diametrically disposed spring pressed ball elements 36 carried by the housing 30 to arrest rotary movement of the sleeve 28 from an adjusted position. As an alternate means of locking the sleeve against rotation a set screw 37 could be provided.

When the motor is put into operation with the parts in the positions shown in Figure 2 the clutch element 12 will be put into rotation by engagement of the clutch element 6 with the clutch element 5 through the medium of the ball elements 8 within the splines or grooves 9 formed on the inner periphery of the clutch element 6 and the matching splines 9A in the peripheral surface of the shaft 7 and the amount of pressure applied to the clutch element 6 in maintaining its engagement with the clutch element 5 is regulated by the sleeve 28 when rotated on its threads about the threads of the housing 30. For example, as shown in Figure 1, the rear marginal edge of the sleeve 28 is provided with graduations from 1 to 9 as a convenience for an operator in determining the amount of pressure to be applied to the clutch element 6. At the "0" setting shown in Figure 1 and with the compression spring 18 in a relatively relaxed condition a minimum amount of pressure is being applied by the spring to the clutch element 6 as a result of which this clutch element will cam away from the clutch element 5 under a low torque. As the sleeve 28 is rotated and retracted on its threads the spring 18 will be correspondingly compressed to progressively increase the amount of pressure against the clutch element 6 to resist the torque necessary to drive the particular screw being dealt with. Further rotation to completely retract the sleeve 28 back to the line indicated as "Positive drive" in Figure 1 will of course fully compress the spring 18 and thereby unite the clutch elements 6—5 in positive or direct drive engagement with each other.

From the foregoing it will be seen that any desired torque adjustment may be quickly and conveniently made whether or not the tool is in operation.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

A screw driving attachment of the type described comprising in combination a hollow cylindrical externally threaded housing adapted for attachment at one of its ends to a portable electric motor having a hollow shaft extending outwardly from one end thereof, a first clutch element secured to the terminal outer end of the motor shaft, a second shaft rotatably and slidably mounted within the hollow motor shaft and extending outwardly from one end thereof, a second clutch element slidably attached to said second shaft for rotation therewith and for coperation with said first clutch element, resilient means carried by said second shaft for yieldingly interlocking both of said clutch elements to resist torque loads on said second shaft, said second shaft being provided with a third clutch element at its outer end for selective engagement with a fourth clutch element carried by a tool chuck slidably and rotatably carried by said outer end of said second shaft, an internally threaded hollow sleeve rotatably attached to the external threads of said housing for axial movement with respect thereto, means interconnecting one end of said sleeve with one end of said resilient means for adjustably applying various compression loads thereto whereby the interlocking engagement of said first and second clutch elements can be varied to resist torque loads on said second shaft, means for locking said sleeve against rotation in any adjusted position, and means for locking said sleeve in a position where both of said clutch elements are interlocked against separation under any torque load on said second shaft.

References Cited in the file of this patent

UNITED STATES PATENTS

| | | |
|---|---|---|
| 2,576,069 | Hoag et al. | Nov. 20, 1951 |
| 2,743,636 | Shaff | May 1, 1956 |